United States Patent
Gibson et al.

(10) Patent No.: US 10,502,177 B2
(45) Date of Patent: Dec. 10, 2019

(54) METHODS AND SYSTEMS FOR IMPROVING ENGINE STARTING

(71) Applicant: Ford Global Technologies, LLC, Dearborn, MI (US)

(72) Inventors: Alex O'Connor Gibson, Ann Arbor, MI (US); David Bruce Reiche, Livonia, MI (US); Steven Wooldridge, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 13/965,000

(22) Filed: Aug. 12, 2013

(65) Prior Publication Data

US 2015/0040864 A1    Feb. 12, 2015

(51) Int. Cl.
| | |
|---|---|
| *F02P 5/00* | (2006.01) |
| *F02P 5/145* | (2006.01) |
| *F02D 41/06* | (2006.01) |
| *F02P 5/15* | (2006.01) |
| *F02P 5/152* | (2006.01) |
| *F02D 31/00* | (2006.01) |
| *F02D 35/02* | (2006.01) |
| *F02D 41/14* | (2006.01) |

(52) U.S. Cl.
CPC ............ *F02P 5/145* (2013.01); *F02D 31/001* (2013.01); *F02D 35/027* (2013.01); *F02D 41/062* (2013.01); *F02P 5/1506* (2013.01); *F02P 5/1521* (2013.01); *F02D 2041/1432* (2013.01); *F02D 2200/101* (2013.01); *F02D 2200/1012* (2013.01); *Y02T 10/46* (2013.01)

(58) Field of Classification Search
CPC . Y02T 10/46; F02B 1/04; F02D 17/04; F02D 37/02; F02D 41/042; F02D 41/062; F02D 41/1498; F02D 35/027; F02D 2041/1432; F02D 2200/101; F02D 2200/1012; F02N 11/0818; F02N 19/005; F02N 2019/009; F02N 99/006; F02P 5/1506; F02P 5/1521; F02P 5/1558; G01L 23/22; G01L 23/221
USPC ............ 123/406.23, 406.21, 406.29, 406.34, 123/406.35, 406.37, 406.53
See application file for complete search history.

(56) References Cited

U.S. PATENT DOCUMENTS

| | | | |
|---|---|---|---|
| 4,385,606 A * | 5/1983 | Hattori et al. ........... | 123/406.49 |
| 4,971,007 A * | 11/1990 | Gopp et al. .............. | 123/406.23 |

(Continued)

OTHER PUBLICATIONS

Anonymous, "A Low Emission Engine Starting Strategy for Start/Stops," IPCOM No. 000240460, Published Jan. 30, 2015, 2 pages.

*Primary Examiner* — Hai H Huynh
*Assistant Examiner* — Gonzalo Laguarda
(74) *Attorney, Agent, or Firm* — Geoffrey Brumbaugh; McCoy Russell LLP

(57) ABSTRACT

Systems and methods for restarting an engine are presented. In one example, spark timing during engine starting is adjusted in response to engine speed and a second control parameter. The second control parameter may be correlated with crankshaft or rod degradation. Spark may be advanced from minimum spark for best torque when engine speed is greater than desired and when the second control parameter does not provide an indication of engine degradation.

16 Claims, 4 Drawing Sheets

(56) References Cited

U.S. PATENT DOCUMENTS

| | | | | |
|---|---|---|---|---|
| 6,334,431 B1 * | 1/2002 | Kanehiro | ............... | F02P 5/045 |
| | | | | 123/406.53 |
| 6,491,024 B1 * | 12/2002 | Connolly | ............... | F02D 41/06 |
| | | | | 123/406.19 |
| 6,901,328 B2 | 5/2005 | Damson et al. | | |
| 7,458,353 B2 | 12/2008 | Takahashi | | |
| 2003/0005749 A1 * | 1/2003 | Nishimura | .................. | 73/35.01 |
| 2006/0288981 A1 * | 12/2006 | Kaneko et al. | ......... | 123/406.37 |
| 2007/0068485 A1 * | 3/2007 | Hilditch | ............. | F02D 41/0255 |
| | | | | 123/299 |
| 2007/0199533 A1 * | 8/2007 | Takahashi | .................. | 123/179.4 |
| 2008/0302331 A1 * | 12/2008 | DeGroot et al. | ......... | 123/406.24 |
| 2010/0108031 A1 * | 5/2010 | Pursifull | .............. | F02P 5/1508 |
| | | | | 123/406.5 |
| 2011/0239988 A1 * | 10/2011 | Reiche | ................. | F02P 5/1506 |
| | | | | 123/406.76 |
| 2012/0280513 A1 | 11/2012 | Cockerill | | |
| 2013/0151128 A1 * | 6/2013 | Ono | ....................... | F02P 5/152 |
| | | | | 701/111 |
| 2014/0196685 A1 * | 7/2014 | Ruhland | .............. | F02B 17/005 |
| | | | | 123/295 |

* cited by examiner

METHODS AND SYSTEMS FOR IMPROVING ENGINE STARTING

FIELD

The present description relates to a system and methods for improving engine starting. The methods may be particularly useful for engines that are automatically stopped and started.

BACKGROUND AND SUMMARY

An engine of a vehicle may be automatically stopped and restarted during the course of vehicle operation to conserve fuel. If the vehicle is operated frequently in stop and go traffic conditions, the engine may be started and stopped more frequently. When the engine is stopped, the engine oil pump pressure is decreased such that the supply of oil to moving engine components such as the engine crankshaft and rods may be reduced. Additionally, during engine restarting engine cylinders may be filled with a relatively large air charge since engine intake manifold pressure can increase toward atmospheric pressure during an engine stop. Consequently, combustion pressures in the engine cylinders may reach higher levels when the engine is being started. As a result of lower oil pressure and higher cylinder pressures, degradation of rotating engine components may increase during engine starting.

Engine starting may also subject portions of a vehicle's driveline to undesirable torque levels if engine speed is not controlled as desired. For example, since torque transmitted through a transmission torque converter increases with increasing input speed to the torque converter, more than a desired amount of engine torque may be transferred to a vehicle driveline if engine speed increases above a threshold engine speed. One way to control engine speed is via spark timing. Retarding spark timing from minimum spark for best torque (MBT) timing can reduce engine output torque, thereby reducing engine speed. Likewise, advancing spark timing from MBT spark timing can reduce engine output torque, thereby reducing engine speed. Advancing spark from MBT timing may provide improved combustion stability as compared to retarding spark timing from MBT timing. However, if spark is advanced further than desired, it may be possible to achieve higher cylinder pressures than is desired. Thus, it may be desirable to limit engine speed via spark advance from MBT; however, control of engine speed via spark advance may also present engine degradation challenges.

The inventors herein have recognized the above-mentioned disadvantages and have developed a method for operating an engine, comprising: during an engine start and run-up, retarding a spark timing advanced from a minimum spark timing for best torque spark timing in response to output of a sensor exceeding or being less than a threshold level correlated to crankshaft, bearing, or rod degradation.

By retarding spark timing advanced from MBT timing in response to output of a sensor exceeding or being less than a threshold output or level correlated to crankshaft, bearing, or rod degradation, it may be possible to control engine speed and reduce engine degradation during engine starting. For example, a knock sensor may be the basis for determining whether or not an undesirable amount of stress is applied to engine components during engine starting. If output of the knock sensor is greater than a threshold level, spark timing advanced of MBT timing may be retarded to control engine degradation. Further, if output of the knock sensor is less than the threshold level, spark timing advanced of MBT timing may be advanced further to reduce engine speed if engine speed is greater than desired.

The present description may provide several advantages. For example, the approach may improve vehicle drivability when an engine is automatically started by controlling engine speed. Additionally, the approach may reduce engine degradation related to controlling engine speed during engine starting. Further still, the approach may also help to reduce engine emissions via improving engine starting repeatability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
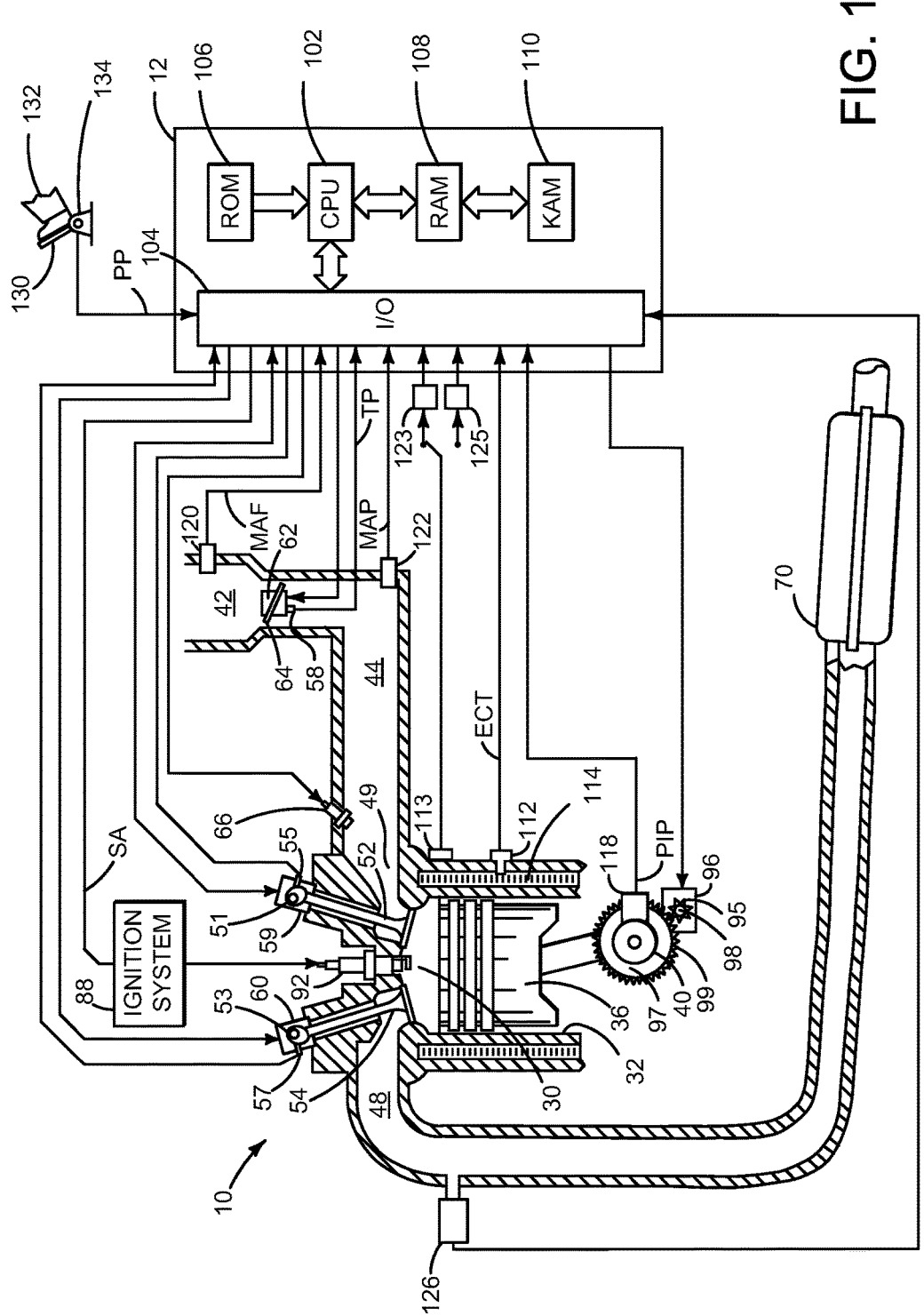
FIG. 1 is a schematic diagram of an engine.
Figure 2:
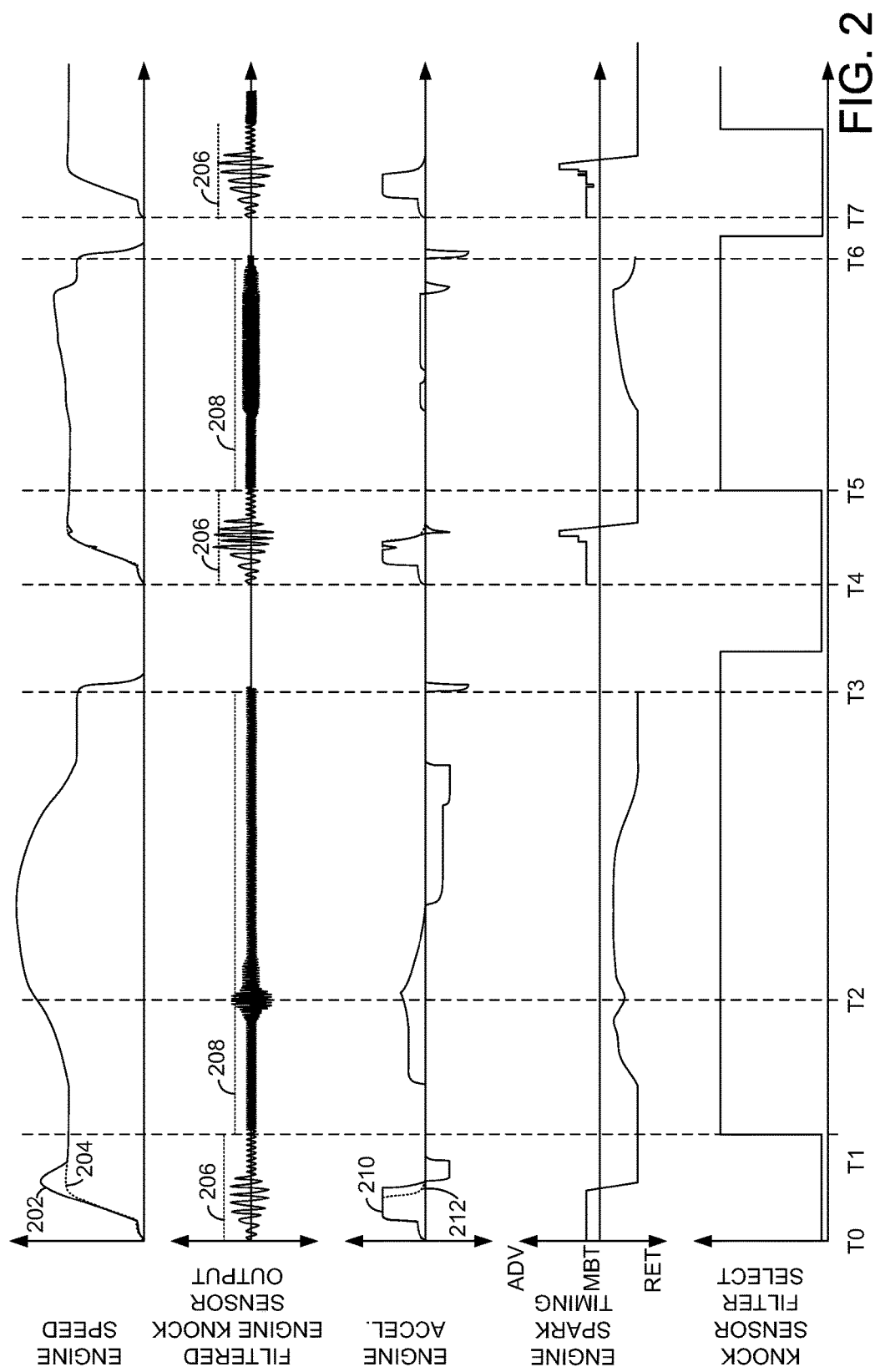
FIG. 2 is a prophetic example engine stopping and starting.
Figure 3:
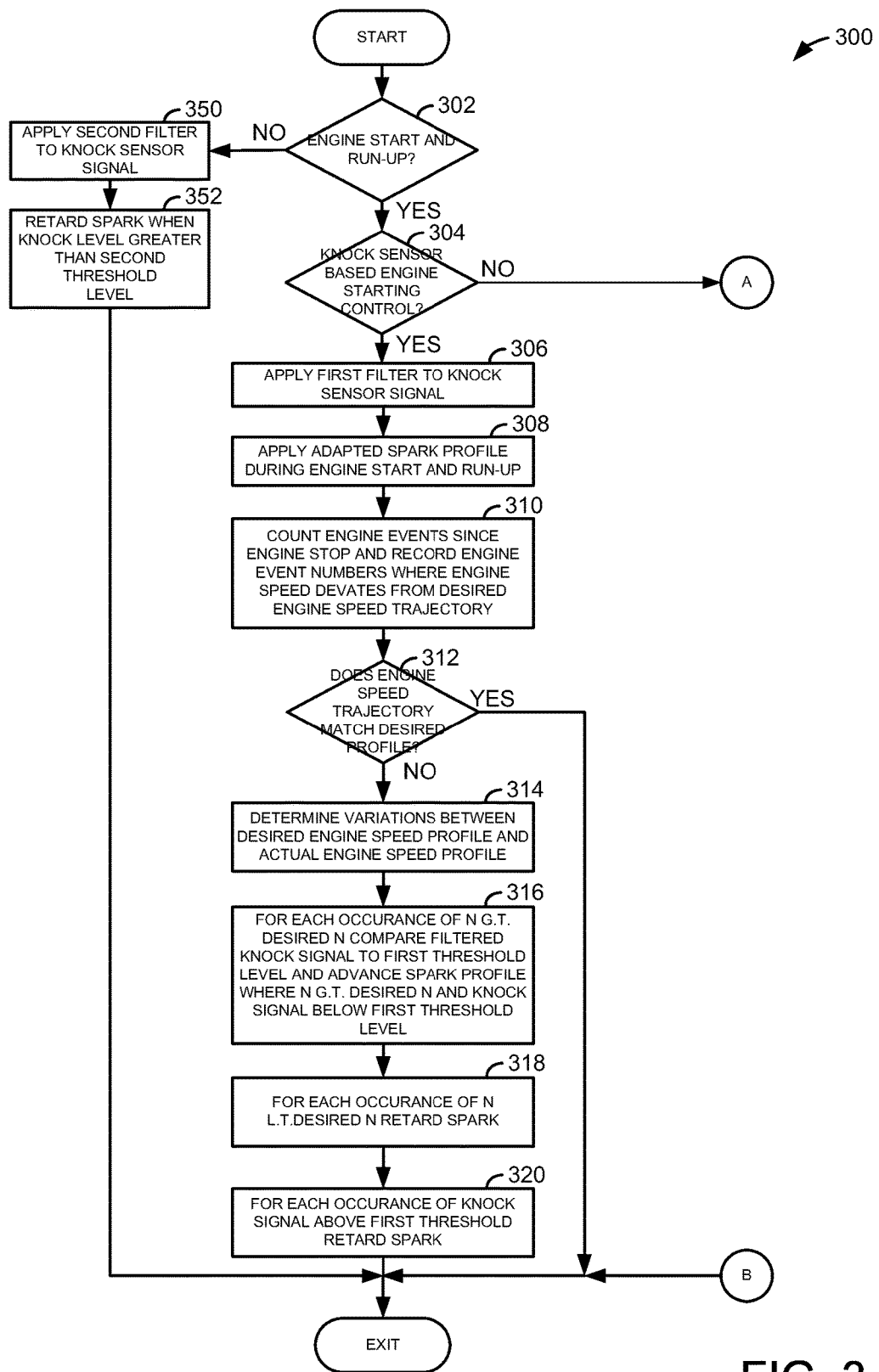
FIG. 3 is a flowchart showing one example method for operating an engine.

The present description is related to controlling engine starting. The engine may be automatically stopped and started based on vehicle conditions. FIG. 1 shows an example engine that may be automatically stopped and started. FIG. 2 shows example engine starting sequences according to the method of FIG. 3. Engine starting operation may be adjusted based on knock sensor output or engine speed sensor output. FIG. 3 shows an example method for operating an engine to control engine speed and engine degradation during engine starting.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via variable intake cam actuator 59 and variable exhaust cam actuator 60.

Fuel injector 66 is shown positioned to inject fuel directly into cylinder intake port 49, which is known to those skilled in the art as port fuel injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Knock sensor 113 provides an indication of engine vibration produced from knock or other conditions via first filter 123 or second filter 125. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. In a process hereinafter referred to as injection, fuel is introduced into the intake port where it vaporizes on the intake valve. The fuel/air mixture is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: an engine including a knock sensor; and a controller including non-transitory instructions executable to adjust a spark timing advanced from minimum spark for best torque spark timing in response to an output of the knock sensor that is below an engine knock frequency. The vehicle system includes where the engine knock frequency is between 5 and 7 kHz, and where the output of the knock sensor is below 3 kHz. The vehicle system further comprises additional instructions to advance the spark timing advanced from minimum spark for best torque spark timing in response to a magnitude of output of the knock sensor being less than a threshold level.

In some examples, the vehicle system further comprises two knock sensor filters, each of the two filters having different cut-off frequencies. In one example, the first knock sensor filter has a cut off frequency of 3 kHz and attenuates frequencies above the cut-off frequency. The second filter has a lower cut-off frequency of 5 kHz and an upper cut-off frequency of 7 kHz. Thus, the second filter passes frequencies between 5 and 7 kHz and attenuates other frequencies. The vehicle system further comprises additional instructions to switch output from the knock sensor to the first filter during engine start and run-up. The vehicle system further comprises additional instructions to switch output from the knock sensor to the second filter after engine start and run-up.

FIG. 2 is a prophetic engine starting according to the method of FIG. 3. Two example engine starts are shown. Engine speed is greater than is desired during a first engine start on the left hand side of FIG. 2. Engine spark timing is adjusted and adapted to provide a more desirable engine start on the right hand side of FIG. 2. The operating sequence of FIG. 2 may be provided via the system of FIG. 1 executing instructions according to the method of FIG. 3 that are stored in non-transitory memory. Vertical markers T0-T7 represent times of particular interest during the sequence. All plots in FIG. 2 are referenced to the same X axis scale.

The first plot from the top of FIG. 2 is a plot of engine speed verses time. The X axis represents time and time increases from the left to right side of FIG. 2. The Y axis represents engine speed and engine speed increases in the direction of the Y axis arrow. Solid line 202 represents actual engine speed. Dashed line 204 represents desired engine speed. Actual engine speed 202 is equal to desired engine speed 204 when only the solid line is visible.

The second plot from the top of FIG. 2 is a plot of filtered engine knock sensor output verses time. The Y axis represents filtered engine knock sensor output and the filtered knock sensor output is zero at the X axis. Filtered knock sensor output is positive above the X axis and negative below the X axis. The X axis represents time and time increases from the left hand side of FIG. 2 to the right hand side of FIG. 2. Horizontal line 206 represents a knock sensor threshold magnitude used during engine cranking and run-up (e.g., the time between engine cranking and when engine speed reaches idle speed). The knock sensor threshold magnitude may be correlated to a level of engine crankshaft, rod, and/or bearing degradation. Filtered knock sensor output above line 206 is undesirable while filtered knock sensor output below line 206 is acceptable during an engine start. Horizontal line 208 represents a knock sensor threshold magnitude used after and not during engine cranking and run-up. The knock sensor threshold magnitude may be correlated to a level of a cylinder pressure limit during knocking (e.g., automatic ignition of end gases after primary ignition via a spark plug or otherwise). Filtered knock sensor output above line 208 is undesirable while filtered knock sensor output below line 208 is acceptable after an engine start. In other examples, the knock sensor threshold magnitude after engine starting may be greater than the knock sensor output threshold magnitude 206 used during engine cranking and run-up.

The third plot from the top of FIG. 2 is a plot of engine acceleration verses time. The X axis represents time and time increases from the left to right side of FIG. 2. The Y axis represents engine acceleration and engine acceleration increases in the direction of the Y axis arrow. Engine acceleration may be determined by determining engine speed from engine position and then determining engine acceleration from engine speed. Solid line 210 represents actual engine acceleration and dashed line 212 represents a desired engine acceleration or desired engine acceleration profile. The actual engine acceleration 210 and desired engine acceleration 212 are the same value when only the actual engine acceleration 210 is visible.

The fourth plot from the top of FIG. 2 is a plot of engine spark timing verses time. The X axis represents time and time increases from the left to right side of FIG. 2. The Y axis represents engine spark timing and engine spark timing is advance of MBT spark timing above the X axis and retarded from MBT spark timing below the X axis. Thus, the X axis represents MBT spark.

The fifth plot from the top of FIG. 2 is a plot of a signal for selecting which of two knock sensor filters are activated. A first knock sensor filter is activated when the knock sensor filter select signal is at the lower level. A second knock sensor filter is activated when the knock sensor filter select signal is at the higher level.

At time T0, the engine is begins to be cranked via a starter motor or motor in the vehicle driveline. The engine may be cranked in response to a driver input or a controller request (not shown). The knock sensor also begins to output a signal as the engine rotates. The engine accelerates from zero speed to engine cranking speed and the actual engine acceleration matches the desired engine acceleration. The spark timing is advanced of MBT spark timing and the first knock sensor filter is selected as indicated by the knock sensor filter select being at a lower level.

Between time T0 and time T1, the engine accelerates to higher engine speeds via combusting air-fuel mixtures. The actual engine speed 202 overshoots the desired engine speed 204 for an undesirable amount of time. The engine filtered knock sensor output is below the knock sensor threshold magnitude 206 and is therefore below a engine crankshaft, rod, or bearing threshold degradation threshold indicating that spark timing may be further used to control engine speed. In this engine start, feedback correction of spark based on the knock sensor output is not used during the engine start. Instead, data gathered during the engine start is used to improve subsequent engine starts via adapting the engine spark profile that is applied during engine starting. The actual engine acceleration 210 continues for an amount of time that exceeds the time requested for the desired acceleration 212, and the actual engine acceleration is related to the actual engine speed 202 overshooting the desired engine speed 204. The engine spark timing is advance from MBT spark timing so as to reduce the engine starting torque and engine speed during engine starting. The engine spark timing transitions from advanced of MBT spark timing to retarded from MBT spark timing after engine speed reaches idle speed. The knock sensor output is filtered via a first filter that has a cut-off frequency of less than 3 kHz and that attenuates frequencies above 3 kHz. Thus, the first knock output filter attenuates engine knock frequencies in the 5-7 kHz range.

Additionally, the engine spark profile used during engine starting is adapted based on the difference in actual engine speed and desired engine speed during engine cranking and run-up. In one example, engine speed is tracked at each combustion event during engine cranking and run-up. If actual engine speed is greater or less than desired engine speed by a predetermined amount, spark timing is adjusted for a combustion event before the combustion event where actual engine speed did not match the desired engine speed. For example, if engine speed is greater than desired engine speed at particular combustion event, spark timing is advanced further in an engine starting spark profile one combustion event prior to the combustion event where actual engine speed exceeded desired engine speed. Advancing spark timing may reduce engine speed and reduce the possibility of actual engine speed overshooting desired engine speed. Similarly, if engine speed is less than desired engine speed at particular combustion event, spark timing is retarded in an engine starting spark profile one combustion event prior to the combustion event where actual engine speed exceeded desired engine speed. Retarding spark timing may increase engine speed and reduce the possibility of actual engine speed undershooting desired engine speed.

At time T1, the engine has completed cranking and run-up. Therefore, the knock sensor output is filtered via a second filter having a pass band between 5 and 7 kHz. The second filter attenuates frequencies below 5 kHz and above 7 kHz to improve the signal to noise ratio for detecting engine knock. The engine speed is shown at idle speed and the knock sensor is outputting a low magnitude signal to indicate the absence of knock. The engine acceleration is zero since the engine is at a constant speed and spark timing is retarded from MBT spark timing.

At time T2, engine speed is increasing in response to an increased driver demand torque (not shown) and the engine begins to knock at a level that exceeds the engine knock threshold 208. The knock sensor output is filtered via the second knock sensor filter and spark timing is retarded in response to the indication of engine knock exceeding the engine knock threshold 208. By retarding spark timing from MBT spark timing, cylinder pressure may be lowered to reduce the possibility of engine knock. The engine speed increase is reflected in the increase in engine acceleration.

At time T3, the engine begins an automatic shutdown. The automatic shutdown may be based on vehicle operating conditions such as the vehicle being stopped, the brake being applied, and driver demand torque being less than a threshold torque. The engine filtered knock sensor output goes to zero as the engine stops and the knock sensor filter is switched from the second filter back to the first filter in anticipation of an engine restart. The spark timing ceases as spark to the engine ceases in response to the engine being shutdown and stopped.

At time T4, the engine is restarted. An adapted engine spark profile is applied during engine cranking and run-up. The spark profile is adjusted from the spark profile used at time T0. Additionally, the engine spark is adjusted real-time in response to engine speed, engine knock sensor output, and/or engine acceleration.

Between time T4 and time T5, the actual engine speed increases with the desired engine speed and the actual engine acceleration increases with the desired engine acceleration, except at two locations where actual engine speed and actual engine acceleration are less than their respective desired values. The engine filtered knock sensor output increases to a level higher than the engine filtered knock sensor output between time T0 and time T1, and the engine filtered knock sensor output exceeds threshold 206 at two engine events since engine stop. The engine spark timing begins at the same spark advance as at time T0; however, the spark timing is advanced for specific combustion events based on spark timing adjustments related to the engine start at time T0. Additionally, spark timing is adjusted real-time in response to differences between actual engine speed and desired engine speed. Spark timing advance may be limited when filtered knock sensor output exceeds threshold 206. By operating the engine according to the adjusted spark timing profile, actual engine speed is controlled to the desired engine speed. The knock sensor output is filtered via the first knock sensor filter as indicated by the knock sensor filter select trace.

The actual engine acceleration also matches the desired engine acceleration, except at two engine events after engine stop. The spark timing is retarded real-time, but it is not retarded sufficiently to match actual engine acceleration to desired engine acceleration. On the other hand, if actual engine acceleration was greater than desired engine acceleration, the spark timing would be advanced further to decrease engine acceleration.

Between time T5 and time T6, the engine is operated according to driver demand torque (not shown) and other engine operating conditions. Further, the filtered engine knock sensor output is less than threshold level 208. Therefore, engine spark timing is not adjusted in response to engine knock sensor output.

At time T6, an engine shutdown and stop are initiated automatically or via a driver command. The filtered engine knock sensor output is reduced and the engine begins to decelerate to zero rotation. Shortly thereafter, the knock sensor filter is switched back to the first knock sensor filter.

At time T7, the engine is automatically restarted or restarted in response to a driver command (not shown). The engine speed profile follows the desired engine speed profile after spark timing adjustment are made to the spark timing profile applied at time T4. In particular, the number of engine events (e.g., engine combustion events) since engine stop were counted at the start at time T4. Engine event numbers were recorded at engine event numbers where output of the sensor exceeded a threshold or where engine speed deviated from desired engine speed by more than a threshold amount of speed. Spark timing at the engine event number where output of the knock sensor exceeded the threshold or where engine speed deviated from desired engine speed minus one engine event is adjusted. For example, if the knock sensor exceeded threshold 206 at engine events 8 and 15 since engine stop during the engine start at time T4, spark timing for engine events 7 and 14 is retarded for the engine start at time T7 as shown. Similar adjustments may be made based on actual engine speed deviation from desired engine speed and actual engine acceleration deviation from desired engine acceleration.

In this way, output of a knock sensor or engine acceleration may be the basis for adjusting engine spark timing during engine starting and run-up. Further, a threshold knock sensor output level may be correlated to engine component degradation levels so that spark timing during engine starting can be adjusted to reduce the possibility of engine degradation related to advancing spark timing beyond MBT spark timing. The threshold knock sensor output and/or engine acceleration levels may be correlated to engine degradation via performing repeated engine starts with a dynamometer and measuring crankshaft, rod, and bearing degradation. The correlation may include determining a degree of engine component degradation based on the knock sensor indicating a value that reaches the threshold value, and then such degradation can be indicated via setting of a diagnostic code in memory in the controller. Additionally, if actual engine speed is not within a predetermined speed of desired engine speed, actual engine acceleration may be compared to desired engine acceleration. The acceleration level difference between actual engine acceleration and desired engine acceleration may be the basis for adjusting engine spark timing.

Figure 4:
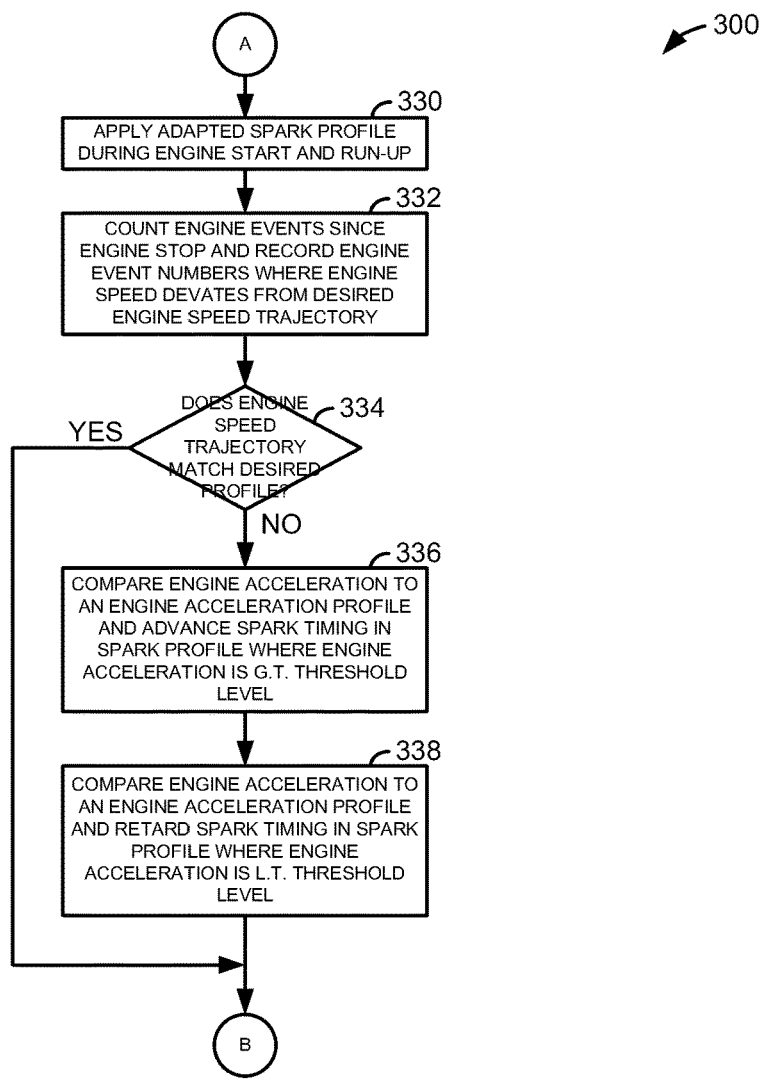
FIG. 4 is a continuation of the flowchart of FIG. 3.

Referring now to FIGS. 3 and 4, a method for operating an engine is shown. The method of FIGS. 3 and 4 may be stored in non-transitory memory as executable instructions for a system as shown in FIG. 1. The method of FIGS. 3 and 4 may provide the operating sequence shown in FIG. 2.

At 302, method 300 judges whether or not the engine is being started. In one example, the engine may be determined to be starting when the engine is being cranked or during engine run-up (e.g., time between engine cranking and the engine reaching idle speed). Further, in some examples, the engine may consider to be starting until engine speed reaches idle speed and is within an idle speed range for a predetermined amount of time. If method 300 judges that the engine is being started, the answer is yes and method 300 proceeds to 304. Otherwise, the answer is no and method 300 proceeds to 350.

At 350, method 300 applies a second filter to output of a knock sensor. In one example, the second filter is a bandpass filter that passes frequencies between 5 and 7 kHz and attenuates other frequencies. The second filter is particularly suited for filtering the knock sensor output for engine vibrations that are indicative of engine knock. The second filter may be selected via a switch that selects between filtering knock sensor output using a first filter or a second filter. Method 300 proceeds to 352 after the second filter is selected and applied to the knock sensor output.

At 352, method 300 retards spark timing when filtered knock sensor output is greater than a threshold level that corresponds to a knock intensity limit. By retarding spark timing when engine knock is detected, it may be possible to reduce the possibility of engine knock exceeding a desired engine knock level. Retarding engine spark can reduce pressure in engine cylinders by changing the timing of peak cylinder pressure relative to top-dead-center compression stroke. If filtered knock sensor output does not exceed the engine knock threshold level, engine spark timing remains the same and without adjustment for knock. Method 300 proceeds to exit after engine spark timing is adjusted or not based on knock sensor output.

In this way, the knock sensor may be used to determine whether or not the engine is knocking during engine operation outside of engine starting. If the engine is determined to be knocking, spark timing may be retarded further from MBT spark timing.

At 304, method 300 judges whether or not a knock sensor is to be used to adjust spark timing during engine starting. In one example, a knock sensor is used to adjust engine spark timing during an engine start when a knock sensor is present. Additionally, other conditions may be applied to judge whether or not a knock sensor is to be used during engine starting as a feedback device to adjust engine spark timing. For example, the knock sensor may be applied to adjust engine spark during engine starting only when engine temperature is greater than a threshold engine temperature. If method 300 judges that a knock sensor is to be used to adjust spark timing for engine starting, the answer is yes and method 300 proceeds to 306. Otherwise, the answer is no and method 300 proceeds to 330.

Thus, method 300 provides that engine spark timing during engine starting may be adjusted based on output of a knock sensor or engine acceleration. However, in some examples, engine spark timing may be adjusted based on output of the knock sensor and engine acceleration. For example, an engine spark adjustment may be determined according to 306-318. At the same time, an engine spark adjustment may be determined according to 330-336. The engine spark profile applied during engine starting may be adjusted based on an average of the spark adjustment determined according to the knock sensor output and the spark adjustment determined according to engine acceleration.

At 330, method 300 applies an adapted spark profile during engine starting. In one example, the engine spark profile applied during engine starting is a table that includes spark timing values for each engine combustion event since engine stop. The spark timing values apply for a predetermined number of engine events (e.g., combustion events, cylinder air induction events, etc.) since engine stop. The spark timing values may be adjusted based on each combustion event or for a group of combustion events (e.g., 10 combustion events). For example, engine combustion events one through three may occupy three cells of the table. The first cell in the table holds spark timing for the first combustion event since engine stop and the spark timing may be advanced five degrees from MBT timing. The second combustion event spark timing since engine stop is in the second table cell and it may be seven degrees advanced from MBT timing. The third combustion event spark timing since engine stop is in the third table cell and it may be eight degrees advanced from MBT spark timing. Additional, spark timing values for subsequent combustion events since engine stop may also be provided.

In another example, spark timing for engine combustion events one through three may occupy a first cell of the table while spark timing for engine combustion events four through six occupy a second cell of the table. The spark entries in the table may represent a spark profile for engine starting. Additionally, the table may be indexed via combustion event number and engine temperature or another variable. Alternatively, the spark profile for engine starting may be index using different variables such as engine cylinder head temperature and time. Thus, spark timings may be adjusted for engine combustion events and engine temperature. Further, specific spark timings in the spark profile may be adapted as described at 334, 336, 314-318.

Spark timings in the spark profile begin at values that are advanced from MBT spark timing for a predetermined number of combustion events since engine stop. After the predetermined number of events, the spark timings are retarded from MBT timing. For example, the first eight combustion events from engine stop are advanced from MBT timing and subsequent spark timing is retarded from MBT timing. Method 300 proceeds to 332 after spark is applied to the engine according to the spark profile.

At 332, method 300 begins counting a number of engine events from engine stop, and method 300 records engine event numbers where engine acceleration deviates from desired engine acceleration for spark adjustments at 336 and 338. Method 300 also adjusts spark timing real-time in response to engine acceleration. For example, if engine acceleration is less than desired engine acceleration at a particular engine event, method 300 may retard spark timing at the next engine event for spark timings that are advanced from MBT spark timing. If engine acceleration is greater than desired engine acceleration, method 300 may advance spark timing at the next engine event for spark timings that are advanced of MBT spark timing. The real-time spark adjustments are late for engine events where the engine acceleration deviation occurred, but the real-time adjustments help to return engine acceleration to the desired engine acceleration. Method 300 proceeds to 334 after engine events are recorded and real-time spark adjustments are made.

At 334, method 300 judges whether or not actual engine acceleration is within a threshold acceleration of desired engine acceleration during engine starting, including during cranking and run-up. In one example, empirically determined desired engine acceleration is stored in memory in a table or function, thereby describing a desired engine acceleration profile for engine starting. The indexing of entries or values in the engine acceleration profile may also match indexing of entries or values in the engine spark timing profile so that spark timings can be directly related and adjusted with respect to engine acceleration variation from desired engine acceleration.

For example, the engine spark profile may include an index into a second cell in the spark profile that assigns a spark timing value stored in the second cell to the second engine combustion event since stop. Similarly, a second cell in the engine acceleration profile may be assigned a value of engine acceleration that is the desired engine acceleration at the time of the second combustion event since engine stop. Thus, if the actual engine acceleration at the second combustion event since engine stop is greater or less than the desired engine acceleration by a predetermined engine speed, the spark timing in the second cell of the spark profile may be adjusted to drive actual engine acceleration to the desired engine acceleration at the time of the second combustion event. Further, spark timing in an adjacent spark profile may be adjusted to account for time for the engine to accelerate. For example, spark for the first combustion event may be adjusted to compensate or reduce the engine acceleration deviation at the second combustion event from engine stop. Thus, spark timing is adjusted at the combustion event where the engine acceleration deviation occurred minus one combustion event.

The engine acceleration profile table or function may be indexed based on engine temperature, and time or number of combustion events since engine start. Values in the table or function are compared to actual engine acceleration during engine starting, if actual engine acceleration is greater or less than desired engine acceleration by more than a predetermined amount (e.g., ±10 RPM/s), the answer is no and method 300 proceeds to 334. Otherwise, the answer is yes and method 300 proceeds to exit. All cells or entries in the engine acceleration profile according to a time or number of combustion events since engine stop may be compared with engine acceleration at the time or number of combustion events since engine stop that corresponds to the table entry.

At 334, method 300 compares recorded actual engine acceleration to desired engine acceleration. The engine acceleration may be correlated to a level of engine crankshaft, rod, or bearing degradation. Actual engine acceleration is determined via the engine position sensor. For example, engine speed may be determined by the time it takes for the engine to rotate from a first position to a second position. Engine acceleration may be determined via taking a derivative of engine speed. Desired engine acceleration during an engine start may be empirically determined and stored in a table or function that is indexed via engine temperature and time or number of combustion event since engine stop, for example. If the recorded actual engine acceleration is greater than the desired engine acceleration for a particular combustion event, the spark timing in the spark profile described at 330 for the particular combustion event and/or adjacent events (e.g., one or more prior combustion events) may be advanced by a predetermined amount. The spark timing is advanced for combustion events where spark timing is advanced from MBT spark timing. Alternatively, the spark timing in the spark profile may be advanced based on the difference between the actual engine acceleration and the desired engine acceleration. In this way, the actual engine acceleration may be driven toward the desired engine acceleration via adapting the engine spark profile. The adjusted spark profile may be applied during subsequent engine starts.

Additionally, spark timing for a subsequent combustion event during the same or present engine start may be advanced a predetermined amount or advanced based on the difference between the actual engine acceleration and the desired engine acceleration so that the actual engine speed and engine acceleration are reduced toward the desired engine speed and acceleration in real-time. Thus, spark timing may be adjusted for the present engine start and subsequent engine starts. Method 300 proceeds to 336 after actual engine acceleration and desired engine acceleration are compared.

At 336, method 300 adjust engine spark timing if the comparison of recorded actual engine acceleration and desired engine acceleration results in an indication of engine acceleration being below or less than a desired engine acceleration. If the recorded actual engine acceleration is less than the desired engine acceleration for a particular combustion event, the spark timing in the spark profile described at 330 for the particular combustion event or adjacent combustion events may be retarded by a predetermined amount (e.g., the combustion event number where the acceleration deviation occurred minus one). Alternatively, the spark timing in the spark profile may be retarded based on the difference between the recorded actual engine acceleration and the desired engine acceleration. In this way, the actual engine acceleration may be driven toward the desired engine acceleration via adapting the engine spark profile. The adjusted spark profile may be applied during subsequent engine starts.

Further, spark timing for a subsequent combustion event during the same or present engine start may be retarded a predetermined amount or retarded based on the difference between the actual engine acceleration and the desired engine acceleration so that the actual engine speed and engine acceleration are increased toward the desired engine speed and acceleration in real-time. In this way, spark timing may be adjusted for the present engine start and subsequent engine starts. Method 300 proceeds to exit after actual engine acceleration and desired engine acceleration are compared.

At 306, method 300 applies a first filter to output of a knock sensor. In one example, the first filter is a low-pass filter that passes frequencies below 3 kHz and attenuates other frequencies. The first filter is particularly suited for filtering engine knock signals from other engine vibrations. The first filter may be selected via a switch that selects between filtering knock sensor output using the first filter or the second filter. Method 300 proceeds to 308 after the first filter is selected and applied to the knock sensor output.

At 308, method 300 applies an adapted spark profile during engine starting. In one example, the engine spark profile applied during engine starting is a table that includes spark advance values for each engine combustion event since engine stop as is described at 330. Specific spark timings in the spark profile may be adapted as described at 336, 338, 314-320.

Spark timings in the spark profile begin at values that are advanced from MBT spark timing for a predetermined number of combustion events since engine stop. After the predetermined number of events, the spark timings are retarded from MBT timing. For example, the first eight combustion events from engine stop are advanced from MBT timing and subsequent spark timing is retarded from MBT timing. Method 300 proceeds to 310 after spark is applied to the engine according to the spark table.

At 310, method 300 begins counting a number of engine events from engine stop, and method 300 records engine event numbers where engine speed deviates from desired engine speed for spark adjustments at 316-320. Further, method 300 records engine events where sensor output exceeds a threshold sensor output. Method 300 also adjusts spark timing real-time in response to engine acceleration as described at 332. Method 300 proceeds to 312 after engine events are recorded and real-time spark adjustments are made.

At 312, method 300 judges whether or not recorded actual engine speed is within a threshold speed of desired engine speed during engine starting, including during cranking and run-up. In one example, an empirically determined desired engine speed is stored in memory in a table or function, thereby describing a desired engine speed profile for engine starting. The indexing of entries or values in the engine speed profile may also match indexing of entries or values in the engine spark profile so that spark timings can be directly related to engine speed variation from desired engine speed.

For example, the engine spark profile may include an index into a second cell in the spark profile that assigns a spark timing value stored in the second cell to the second engine combustion event since stop. Similarly, a second cell in the engine speed profile may be assigned a value of engine speed that is the desired engine speed at the time of the second combustion event since engine stop. Thus, if the recorded actual engine speed at the second combustion event since engine stop is greater or less than the desired engine speed by a predetermined engine speed, the spark timing in the second cell of the spark profile may be adjusted to drive actual engine speed to the desired engine speed at the time of the second combustion event. Further, spark timing in an adjacent spark profile may be adjusted to account for time for the engine to accelerate.

The engine speed profile table or function may be indexed based on engine temperature, and time or number of combustion events since engine start. Values in the engine speed profile table or function are compared to actual engine speed during engine starting, if engine speed is greater or less than desired engine speed by more than a predetermined amount (e.g., ±25 RPM), the answer is no and method 300 proceeds to 314. Otherwise, the answer is yes and method 300 proceeds to exit. All cells or entries in the engine speed profile according to a time or number of combustion events since engine stop may be compared with engine speed at the time or number of combustion events since engine stop that corresponds to the table entry.

At 314, method 300 determines variations between desired engine speed and recorded actual engine speed for all entries in the engine speed profile that correspond to present engine starting conditions. For example, for each engine event determined at 310 where engine speed variation or sensor output is greater than a threshold level, the engine event number is recorded. At each recorded engine event number, the difference between recorded actual engine speed and desired engine speed is determined. The engine speed variation is stored to memory so that the engine spark profile entry that corresponds to the engine event where the engine speed deviation occurred, and possibly adjacent spark profile entries (e.g., the identified combustion event number where engine speed deviation occurred minus one), may be adjusted. Other variations between recorded actual engine speed and other engine speed profile entries are also determined and specific spark profile entries that correspond to the time or number of engine events where the engine speed variation occurred are identified and stored to memory. Method 300 proceeds to 318 after timings of engine speed variation during engine start are determined.

At 318, for every occurrence when recorded actual engine speed varied from desired engine speed by more than a predetermined speed as determined at 316, method 300 compares knock sensor output filtered via the first filter to a first threshold knock sensor level that is correlated to a level of engine degradation for the engine crankshaft, bearings, and/or rod. Spark timing in the spark profile location, or adjacent location (e.g., the previous engine event), that corresponds to the time or number of engine events since engine stop is advanced where actual engine speed is greater than desired engine speed and where the filtered knock sensor output is less than the first threshold knock sensor level. The spark timing may be advanced a predetermined amount or by an amount that is based on the difference between actual engine speed and desired engine speed. In this way, the spark profile for engine starting may be adapted.

Additionally, spark timing for a subsequent engine event after engine speed is determined to be less than or greater than a desired engine speed may be adjusted so that engine speed is controlled real-time via spark advance adjustments. For example, if engine temperature is 75° C., the engine is at the second combustion event where desired engine speed is 350 RPM, and where actual engine speed is 425 RPM, spark timing for a subsequent combustion event may be advanced by a predetermined amount or by an amount that is based on the difference between actual engine speed and desired engine speed when filtered knock sensor output is less than the first threshold knock sensor level. In this way, method 300 may also adjust spark timing real-time to control engine speed. Method 300 proceeds to 318 after adjusting spark for the described conditions.

At 318, for each occurrence of recorded actual engine speed being less than desired engine speed, corresponding spark timings in the spark profile that occur at the time or number of engine events since engine stop are retarded from spark timings in the spark profile. For example, if recorded actual engine speed is less than desired engine speed at the second combustion event since engine stop, which corresponds to the spark timing in the second cell of the spark profile, the spark timing in the profile at the second cell is retarded from its present value. The spark timing may be retarded a predetermined amount or an amount that is based on the difference between actual engine speed and desired engine speed. Further, spark timing for a previous or subsequent engine event may also be adjusted to adapt the spark profile.

Further, spark timing for a subsequent combustion event after engine speed is determined to be less than a desired engine speed may be adjusted so that engine speed is controlled real-time via spark advance adjustments. For example, if engine temperature is 75° C., the engine is at the second combustion event where desired engine speed is 350 RPM, and where actual engine speed is 275 RPM, spark timing for a subsequent combustion event may be retarded by a predetermined amount or by an amount that is based on the difference between actual engine speed and desired engine speed. In this way, method 300 may also adjust spark timing real-time to control engine speed. Method 300 proceeds to 320 after adjusting spark for the described conditions.

At 320, for each recorded occurrence of the filtered knock signal exceeding the threshold knock sensor level, spark timing in the spark profile that corresponds to the time or number of engine events after engine stop where the threshold knock level was exceeded, the spark timing in the spark profile is retarded. For example, if filtered knock sensor output is greater than the first threshold knock level, at the second combustion event since engine stop, which corresponds to the spark timing in the second cell of the spark profile, the spark timing in the profile at the second cell is retarded from its present value. The spark timing may be retarded a predetermined amount or an amount that is based on the difference between actual engine speed and desired engine speed. Additionally, spark timing values may be retarded for one or more engine event numbers before the engine event where the sensor output exceeded the threshold level.

Further, spark timing for a subsequent engine event (e.g., combustion event) after the filtered knock sensor output exceeds the threshold knock sensor output level may be adjusted so engine degradation may be less than the engine degradation level that is correlated to the threshold knock sensor output level. For example, if engine temperature is 75° C., the engine is at the second combustion event where filtered knock sensor output exceeds the threshold knock sensor level, spark timing for a subsequent combustion event may be retarded by a predetermined amount or by an amount that is based on the difference between filtered knock sensor output and the threshold knock sensor level. In this way, method 300 may also adjust spark timing real-time to control engine degradation during engine starting. Method 300 proceeds to exit after adjusting spark for the described conditions.

Thus, the method of FIG. 3 provides for operating an engine, comprising: during an engine start and run-up, retarding a spark timing advanced from a minimum spark timing for best torque spark timing in response to output of a sensor exceeding or being less than a threshold level correlated to crankshaft, bearing, or rod degradation. The method includes where the sensor is a knock sensor. The method further comprises advancing the spark timing advanced from the minimum spark timing for best torque spark timing in response to engine speed greater than a desired engine speed and output of the sensor being less than the threshold correlated to crankshaft, bearing, or rod degradation.

In some examples, the method includes where the sensor is an engine position sensor, and where output of the engine position sensor is manipulated into an engine acceleration value. The method further comprises retarding the spark timing advanced from the minimum spark timing for best torque spark timing in response to the engine acceleration value being less than a desired engine acceleration correlated to crankshaft, bearing, or rod degradation. The method of claim further comprises advancing the spark timing advanced from the minimum spark timing for best torque spark timing in response to the engine acceleration value being greater than a desired engine acceleration correlated to crankshaft, bearing, or rod degradation. The method includes where the spark timing advanced from the minimum spark timing for best torque spark timing is advanced from the minimum spark timing for best torque spark timing for a predetermined number of cylinder combustion events since engine stop, and further comprising retarding spark timing from the minimum spark timing for best torque spark timing after the predetermined number of cylinder combustion events.

The method of FIG. 3 also provide for operating an engine, comprising: during an engine start and run-up, advancing a spark timing advanced from a minimum spark timing for best torque spark timing in response to output of a sensor not exceeding a threshold correlated to crankshaft, bearing, or rod degradation, the output filtered via a first filter. The method further comprises filtering the output via a second filter different from the first filter after engine start and run-up. The method includes where the first filter is not applied to the output after engine cranking and run-up. In some examples, the method includes where the second filter is not applied during engine cranking and run-up. The method includes where the sensor is a knock sensor. The method further comprises adapting an engine event based spark profile in response to the output filtered via the first filter.

As will be appreciated by one of ordinary skill in the art, method described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   during an engine starting and run-up, retarding a spark timing advanced from a minimum spark timing for best torque spark timing via a controller in response to an output of a knock sensor filtered via a first filter, and retarding spark timing via the controller in response to an output of the knock sensor filtered via a second filter after the engine starting and run-up; and
   counting an actual total number of combustion events since engine stop and adjusting spark timing of a spark profile based on engine speed deviation at an engine combustion event number, the engine combustion event number based on the counted actual total number of combustion events since engine stop, and retarding the spark timing advanced from the minimum spark timing for best torque spark timing in further response to the output of the knock sensor filtered via the first filter exceeding a first threshold level.

2. The method of claim 1, further comprising advancing the spark timing advanced from the minimum spark timing for best torque spark timing during the engine starting and run-up in response to engine speed greater than a desired engine speed and the output of the knock sensor filtered via the first filter being less than a threshold level correlated to crankshaft, bearing, or rod degradation.

3. The method of claim 1, where the first threshold level is active during the engine starting and run-up, and where a second threshold level is active when the engine is not starting and running up, and where the second filter has a cut-off frequency different than a cut-off frequency of the first filter.

4. The method of claim 3, further comprising retarding the spark timing advanced from the minimum spark timing for best torque spark timing during the engine starting and run-up in response to engine speed being less than a desired engine speed and the output of the knock sensor filtered via the first filter being less than a threshold level correlated to crankshaft, bearing, or rod degradation.

5. The method of claim 3, further comprising adjusting spark timing during the engine starting and run-up in response to an average of a spark adjustment based on the output of the knock sensor filtered via the first filter and a spark adjustment based on engine acceleration.

6. A method for operating an engine, comprising:
   during a first engine start and run-up, advancing a spark timing advanced from a minimum spark timing for best torque spark timing via a controller in response to an output of a knock sensor not exceeding a threshold, the output filtered via a first filter and not a second filter during the first engine start and run-up and the output filtered via the second filter and not the first filter after the first engine start and run-up; and
   counting an actual total number of engine events since engine stop and recording an engine event number where the output of the knock sensor exceeds the threshold, and advancing the spark timing advanced from the minimum spark timing for best torque spark timing at the engine event number where the output of the knock sensor exceeds the threshold.

7. The method of claim 6, wherein the threshold is adjusted responsive to a predetermined level of degradation of a crankshaft.

8. The method of claim 7, where the threshold is adjusted to a first value during engine starting and a second value after engine starting.

9. The method of claim 6, further comprising, during a second engine start after the first engine start, retarding spark advance at the engine event number minus one where the output of the knock sensor exceeded the threshold.

10. The method of claim 9, further comprising adapting an engine event based spark profile in response to the output of the knock sensor filtered via the first filter.

11. The method of claim 10, further comprising retarding spark timing in response to an indication of engine knock after the first engine start and run-up.

12. A vehicle system, comprising:
an engine including a knock sensor; and
a controller including instructions stored in non-transitory memory executable to adjust a spark timing advanced from minimum spark for best torque spark timing during engine run-up in response to an output of the knock sensor that is filtered via a first filter having a pass frequency below an engine knock frequency, wherein the engine knock frequency is between 5 and 7 kHz, and where the pass frequency is below 3 kHz.

13. The vehicle system of claim 12, further comprising additional instructions to advance the spark timing advanced from minimum spark for best torque spark timing during engine run-up in response to a magnitude of the output of the knock sensor being less than a threshold level.

14. The vehicle system of claim 12, further comprising filtering the output of the knock sensor via a second filter and adjusting spark timing in response to an output of the knock sensor filtered via the second filter, the first filter having a different cut-off frequency than the second filter.

15. The vehicle system of claim 14, further comprising additional instructions to switch the output of the knock sensor to the first filter during engine start and run-up.

16. The vehicle system of claim 15, further comprising additional instructions to switch the output of the knock sensor to the second filter after engine start and run-up.

* * * * *